US009097739B2

(12) United States Patent
Silverman et al.

(10) Patent No.: US 9,097,739 B2
(45) Date of Patent: Aug. 4, 2015

(54) SYSTEM FOR LIGHTWEIGHT IMAGE PROCESSING

(75) Inventors: Justin David Silverman, Pacific Palisades, CA (US); Adam Sean Jermyn, Longmeadow, MA (US); Nina Markovic, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 297 days.

(21) Appl. No.: 13/534,428

(22) Filed: Jun. 27, 2012

(65) Prior Publication Data

US 2013/0064458 A1 Mar. 14, 2013

Related U.S. Application Data

(60) Provisional application No. 61/501,322, filed on Jun. 27, 2011.

(51) Int. Cl.
| | | |
|---|---|---|
| G06K 9/36 | (2006.01) | |
| G01Q 30/04 | (2010.01) | |
| B82Y 35/00 | (2011.01) | |
| G06K 9/00 | (2006.01) | |
| G06K 9/50 | (2006.01) | |
| G06T 7/00 | (2006.01) | |
| G06T 7/60 | (2006.01) | |

(52) U.S. Cl.
CPC ............. *G01Q 30/04* (2013.01); *B82Y 35/00* (2013.01); *G06K 9/0014* (2013.01); *G06K 9/50* (2013.01); *G06T 7/0083* (2013.01); *G06T 7/602* (2013.01); *C01B 2202/34* (2013.01); *G06T 2207/30108* (2013.01)

(58) Field of Classification Search
None
See application file for complete search history.

(56) References Cited

U.S. PATENT DOCUMENTS

| 5,841,892 | A * | 11/1998 | McGrath et al. ............... 382/141 |
|---|---|---|---|
| 6,501,848 | B1 * | 12/2002 | Carroll et al. ................. 382/128 |
| 2005/0256400 | A1 * | 11/2005 | Raman et al. ................. 600/425 |
| 2009/0116696 | A1 * | 5/2009 | McKernan et al. ........... 382/108 |
| 2009/0292182 | A1 * | 11/2009 | Horn ............................. 600/302 |
| 2009/0316977 | A1 * | 12/2009 | Juncker et al. ................ 382/133 |
| 2010/0067760 | A1 * | 3/2010 | Zhang et al. .................. 382/130 |
| 2011/0299784 | A1 * | 12/2011 | Katti et al. .................... 382/197 |

OTHER PUBLICATIONS

Ziegler, Kirk J., Urs Rauwald, Zhenning Gu, Feng Liang, W. E. Billups, Robert H. Hauge, and Richard E. Smalley. "Statistically accurate length measurements of single-walled carbon nanotubes." Journal of nanoscience and nanotechnology 7, No. 8 (2007): 2917-2921.*

* cited by examiner

*Primary Examiner* — Sumati Lefkowitz
*Assistant Examiner* — Carol Wang
(74) *Attorney, Agent, or Firm* — Johns Hopkins Technology Transfer

(57) ABSTRACT

An embodiment in accordance with the present invention provides a system and method for image analysis and processing. The present invention provides a software package for processing AFM data. More particularly it can be used for characterizing carbon nanotubes found within AFM images, though it does offer editing features that are general in nature. Its features are split amongst five menus, one button, and four data panels. The software package can be used to determine physical characteristics related to the imaged subject, such as, for instance length data for imaged carbon nanotubes.

14 Claims, 6 Drawing Sheets

SYSTEM FOR LIGHTWEIGHT IMAGE PROCESSING

CROSS REFERENCE TO RELATED APPLICATIONS

This application claims the benefit of U.S. Provisional Patent Application No. 61/501,332, filed Jun. 27, 2011, which is incorporated by reference herein, in its entirety.

GOVERNMENT SUPPORT

This invention was made with government support under NSF DMR 0547834 awarded by the National Science Foundation. The government has certain rights in the invention.

FIELD OF THE INVENTION

The present invention relates generally to computer software. More particularly, the present invention relates to computer software for image processing and analysis, especially for carbon nanotubes.

BACKGROUND OF THE INVENTION

Developments in the last few years have shown that carbon nanotubes (CNTs) can be used in a wide variety of applications due to their size, inert chemical composition, and unique electronic properties. On a microscopic scale, these applications may range from use in targeted cancer cell destruction to potential uses in terahertz imaging. On a macroscopic scale, their incredibly high strength to weight ratio makes them extremely promising in a wide variety of structural applications. In order to use them as a building material, many researchers are looking to produce bulk quantities of long carbon nanotubes. Other researchers are more interested in producing ultra-short carbon nanotubes (US-CNTs), generally less than 50 nm, as these ultra-short tubes allow for the modulation of their electronic properties and are likely to reduce the potentially toxic side effects that their longer counterparts produce.

An extraordinary number of such applications for CNTs require precise methods for controlling the lengths of CNTs. Generally lengths for CNTs can span more than 9 orders of magnitude, and different methods are required for determining CNT lengths within different parts of this length spectrum. Development of such length-control methods requires that CNT samples be characterized in order to evaluate the effectiveness of a given technique. With no single procedure being able to span the entire range of required CNT lengths it is very likely that the need for accurate length distribution data will continue. Even at the lower end of their length spectrum, lengths on the order of nanometers to micrometers, their large aspect ratio makes many types of microscopy difficult when the ultimate goal is to obtain length distribution data. For instance, while transmission electron microscopy (TEM) is able to resolve the internal structure of CNTs better than any other known technique, its small field of view makes it almost useless for extracting length distribution data.

On the other hand, techniques such as scanning electron microscopy (SEM) have a much larger field of view but cannot obtain the same level of resolution necessary to distinguish individual tubes with the accuracy required. Indeed, all currently known forms of optical microscopy are unable to resolve CNTs at all. Again, the issue here is that even millimeter long CNTs have widths that are on the order of nanometers. Currently, scanning probe microscopy (SPM) is the best equipped form of microscopy to extract length distribution data of CNTs. With SPM, and most specifically atomic force microscopy (AFM), a specific form of SPM, individual nanotubes may be resolved in a 10×10 micrometer field of view while larger fields of view may resolve individual CNT ropes and bundles.

Currently, software available for characterization of SPM data focuses on the characterization of gross topological features such as quantifying the overall roughness of a sample or bump analysis. While these gross characterization tools are very useful and necessary, they often do little to characterize individual features or objects visible in the image. The only comparable software currently available is produced by Smart Imaging Technologies, a software package that they call SIMAGIS®. The SIMAGIS software itself is a general image analysis suite for which specific modules may be purchased that extend the software's functionality. However, these modules are often simply an addition to a very large and costly base program that often contains far more features than are needed or desired. Furthermore, these large platforms are often unable to adapt the fundamental inner-workings of their program to best fit the job at hand. Additionally, a larger code base to maintain means that, in general, the SIMAGIS package cannot adapt to fundamentally new requirements as quickly as a smaller piece of software more focused in its purpose. Smart Imaging Technologies was unable to extract any meaningful data from a sample nanotube image, because the samples were not flat enough and that their software was unable to extract the relevant data from the background noise.

Therefore, it would be advantageous to be able to extract length distribution data from background noise for CNTs via SPM and specifically by AFM.

SUMMARY OF THE INVENTION

The foregoing needs are met, to a great extent, by the present invention, wherein in one aspect, a method for determining lengths of carbon nanotubes, to be executed on a computing device, includes a step of obtaining image data for the carbon nanotubes for which length data is desired. The method also include a step of processing the image data with a low-pass filter to filter height data said processing resulting in a first set of data points corresponding to the carbon nanotubes. Another step includes looking for a second set of data points related to the first set of data points, and yet another step includes processing the first and second sets of data points with a statistical connector module, an end finding module, a cross finding module, and end pairing module programmed onto the computing device said processing resulting in a processed data set related to the carbon nanotubes. A step includes determining the lengths of the carbon nanotubes using the first and second data sets and the processed data set related to the carbon nanotubes. The method also include a step of outputting the lengths of the carbon nanotubes in a format requested by a user.

In accordance with an aspect of the present invention a method for lightweight image processing, programmed on a computing device, includes a step of obtaining image data for an image to be processed and a step of processing the image with a low-pass filter to filter image data said processing resulting in a first set of data points corresponding to a feature in the image to be analyzed. The method includes a step of looking for a second set of data points related to the first set of data points and a step of processing the first and second sets of data points with a statistical connector module, an end finding module, a cross finding module, and end pairing module said processing resulting in a processed data set related to the feature in the image to be analyzed. Another step includes determining characteristics related to the feature in the image to be analyzed using the first and second data sets and the processed data set related to the feature in the image to be analyzed. The method also includes a step of outputting the characteristics related to the feature in the image to be analyzed in a format requested by a user.

In accordance with another aspect of the present invention, the method further includes said statistical connector module executing a method for determining, amongst a set of identified lines with known endpoints, which endpoints are connected in an image for analysis. The statistical connector module executes a method including a step of starting at a first one of the known endpoints of an identified line in the set of identified lines and taking a jump to a point which deviates most from all surrounding points in the image for analysis, and another step of repeating the jump to another point which deviates most from all of the surrounding points to find a path that has a measurable deviation from local background noise in the image for analysis until the path reaches a second one of the known endpoints of an identified line in the set of identified lines. The method also includes a step of determining if the measurable deviation of the path is within a predetermined statistically significant range and a step of drawing in a feature represented by the path in the image to be analyzed if the measurable deviation of the path is within the predetermined statistically significant range. A step of outputting to a user data regarding the feature and the path, is also included. The predetermined statistically significant range is approximately two standard deviations.

In accordance with yet another aspect of the present invention, the end finding module executes a method including a step of picking a first random point on a line within the first and second sets of datapoints and a step of finding a second random point that is farthest from the first random point. The method also includes a step of making the second random point a first starting point and finding a third random point that is farthest from the second random point and labeling the third random point as the second starting point. Additionally, the method continues until an $n^{th}$ point found is the same as the $n^{th}-1$ point.

In accordance with still another aspect of the present invention, the cross-finding module executes a method including a step of looking at a first point of every point on a line formed by the points in the first and second datasets and a step of checking the first point within a ring having an inner radius r1 and an outer radius r2, wherein r1<r2, and wherein the ring is centered at the first point. The method also executes a step of forming a grid from all of the points that lie within the ring, and a step of looking for a contiguous shape within the grid. Additionally, the method includes a step of labeling the first point as a cross point if at least two contiguous shapes are found.

In accordance with yet another aspect of the present invention, the end finding module executing a method including a step of identifying all end point candidates within the first and second datasets. Another step includes considering paths between all end point candidates. The method also includes a step of choosing one of the paths that maximizes the ratio between a direct length and a length along the path. The output can include a list of a length for each carbon nanotube in the image. Additionally, a user can manually intervene in the method to assist in the process of determining a length for each carbon nanotube in the image.

In accordance with still another aspect of the present invention, a method for determining, amongst a set of identified lines with known endpoints, which endpoints are connected in an image for analysis programmed onto a computing device, includes a step of starting at a first one of the known endpoints of an identified line in the set of identified lines and taking a jump to a point which deviates most from all surrounding points in the image for analysis. The method includes another step of repeating the jump to find a path that has a measurable deviation from local background noise in the image for analysis until the path reaches a second one of the known endpoints of an identified line in the set of identified lines. A step includes determining if the measurable deviation of the path is within a predetermined statistically significant range. The method also includes a step of drawing in a feature represented by the path in the image to be analyzed if the measurable deviation of the path is within the predetermined statistically significant range. Additionally, the method includes outputting to a user data regarding the feature and the path.

In accordance with yet another aspect of the present invention, the predetermined statistically significant range is approximately two standard deviations. The identified lines correspond to carbon nanotubes for which length data is desired. The output includes a list of a length for each carbon nanotube in the image.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings.

Therefore, it is to be understood that the presently disclosed subject matter is not to be limited to the specific embodiments disclosed and that modifications and other embodiments are intended to be included within the scope of the appended claims.

An embodiment in accordance with the present invention provides a system and method for image analysis and processing. The present invention provides a software package for processing AFM data. More particularly it can be used for characterizing carbon nanotubes found within AFM images, though it does offer editing features that are general in nature. Its features are split amongst five menus, one button, and four data panels. The software package can be used to determine physical characteristics related to the imaged subject, such as, for instance length data for imaged carbon nanotubes.

Figure 1:
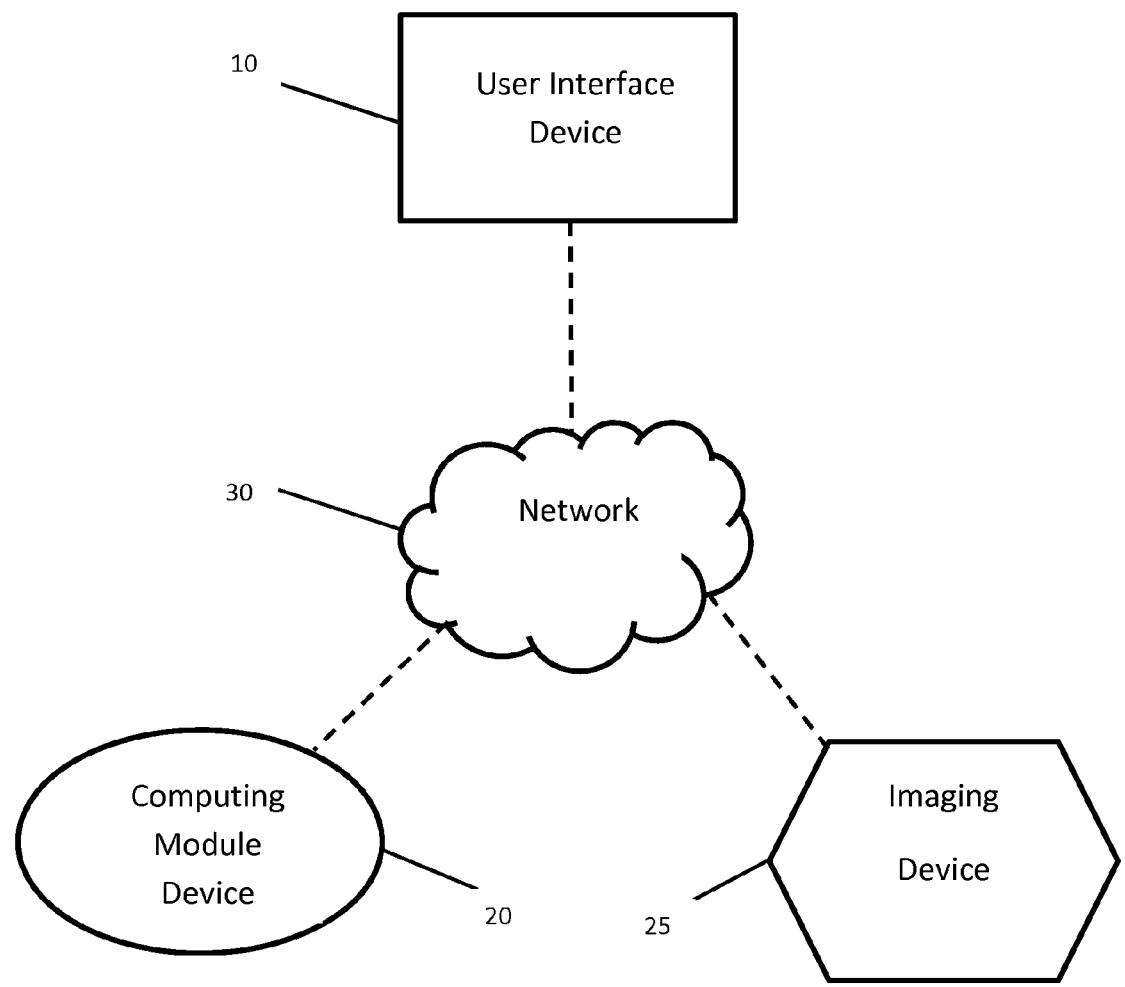
FIG. 1 illustrates a schematic view of a system for image processing according to an embodiment of the present invention.

In one embodiment, illustrated in FIG. 1, the system for image analysis and processing can include a user interface device 10, and a computing module device 20. In some embodiments the system can include an imaging device 25. However, the image data can also be supplied from other sources that will be discussed herein, such as, a server, memory, disk, network, or internet. The user interface device 10 and the computing module device 20 may be a general computing device, such as a personal computer (PC), a UNIX workstation, a server, a mainframe computer, a personal digital assistant (PDA), smartphone, cellular phone, a tablet computer, a slate computer, or some combination of these. Alternatively, the user interface device 10 and the computing module device 20 may be a specialized computing device conceivable by one of skill in the art. The remaining components may include programming code, such as source code, object code or executable code, stored on a computer-readable medium that may be loaded into the memory and processed by the processor in order to perform the desired functions of the system.

Figure 2:
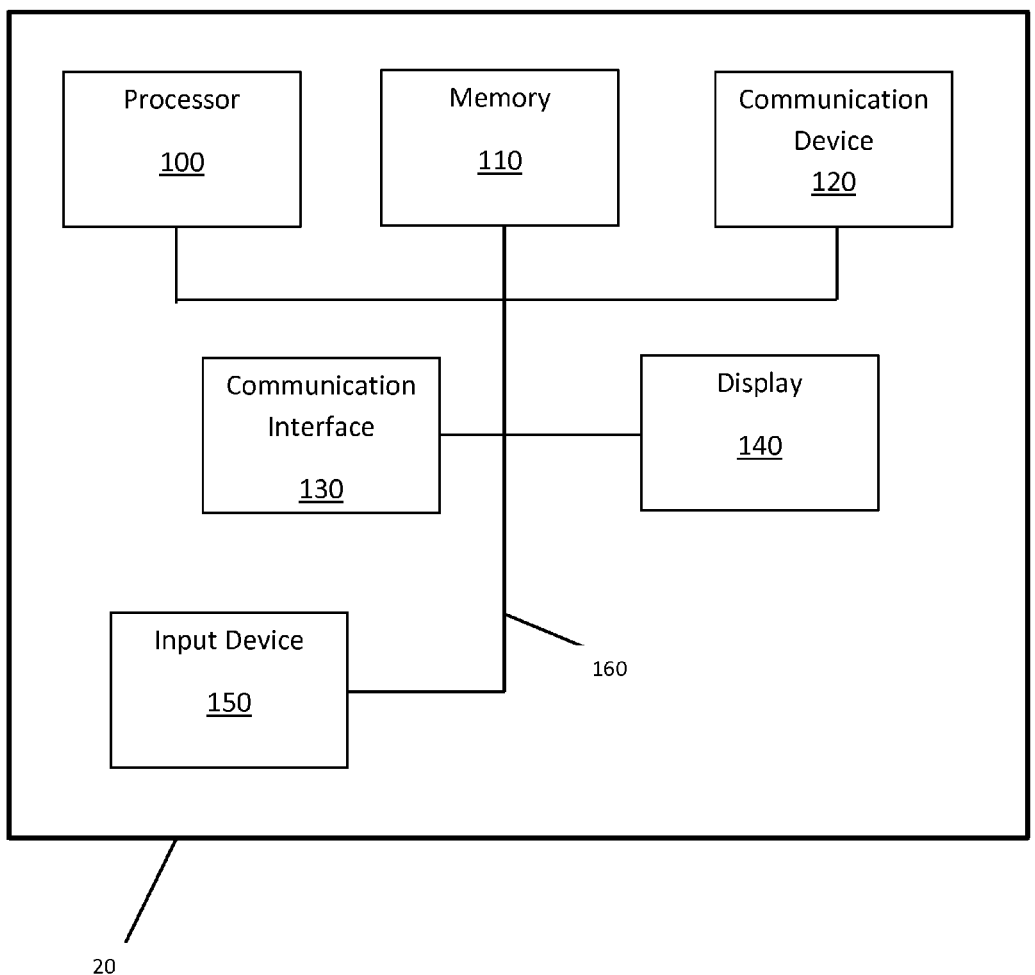
FIG. 2 illustrates a first schematic view of a computing device for image processing according to an embodiment of the present invention.

The user interface device 10 and the computing module device 20 may communicate with each other over a communication network 30 via their respective communication interfaces as exemplified by element 130 of FIG. 2. Likewise the imaging device 25 can also communicate over the communication network 30. The communication network 30 can include any viable combination of devices and systems capable of linking computer-based systems, such as the Internet; an intranet or extranet; a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; cellular system; satellite system; a combination of any number of distributed processing networks or systems or the like.

Referring now to FIG. 2, the user interface device 10 and the computing module device 20 can each include a processor 100, a memory 110, a communication device 120, a communication interface 130, a display 140, an input device 150, and a communication bus 160, respectively. The processor 100, may be executed in different ways for different embodiments of each of the user interface device 10 and the computing module device 20. One option is that the processor 100, is a device that can read and process data such as a program instruction stored in the memory 110, or received from an external source. Such a processor 100, may be embodied by a microcontroller. On the other hand, the processor 100 may be a collection of electrical circuitry components built to interpret certain electrical signals and perform certain tasks in response to those signals, or the processor 100, may be an integrated circuit, a field programmable gate array (FPGA), a complex programmable logic device (CPLD), a programmable logic array (PLA), an application specific integrated circuit (ASIC), or a combination thereof. Different complexities in the programming may affect the choice of type or combination of the above to comprise the processor 100.

Similar to the choice of the processor 100, the configuration of a software of the user interface device 10 and the computing module device 20 (further discussed herein) may affect the choice of memory 110, used in the user interface device 10 and the computing module device 20. Other factors may also affect the choice of memory 110, type, such as price, speed, durability, size, capacity, and reprogrammability. Thus, the memory 110, of user interface device 10 and the computing module device 20 may be, for example, volatile, non-volatile, solid state, magnetic, optical, permanent, removable, writable, rewriteable, or read-only memory. If the memory 110, is removable, examples may include a CD, DVD, or USB flash memory which may be inserted into and removed from a CD and/or DVD reader/writer (not shown), or a USB port (not shown). The CD and/or DVD reader/writer, and the USB port may be integral or peripherally connected to user interface device 10 and the remote database device 20.

In various embodiments, user interface device 10 and the computing module device 20 may be coupled to the communication network 30 (see FIG. 1) by way of the communication device 120. Imaging device 25 can also be connected by way of communication device 120, if it is included. In various embodiments the communication device 120 can incorporate any combination of devices—as well as any associated software or firmware—configured to couple processor-based systems, such as modems, network interface cards, serial buses, parallel buses, LAN or WAN interfaces, wireless or optical interfaces and the like, along with any associated transmission protocols, as may be desired or required by the design.

Working in conjunction with the communication device 120, the communication interface 130 can provide the hardware for either a wired or wireless connection. For example, the communication interface 130, may include a connector or port for an OBD, Ethernet, serial, or parallel, or other physical connection. In other embodiments, the communication interface 130, may include an antenna for sending and receiving wireless signals for various protocols, such as, Bluetooth, Wi-Fi, ZigBee, cellular telephony, and other radio frequency (RF) protocols. The user interface device 10 and the computing module device 20 can include one or more communication interfaces 130, designed for the same or different types of communication. Further, the communication interface 130, itself can be designed to handle more than one type of communication.

Additionally, an embodiment of the user interface device 10 and the computing module device 20 may communicate information to the user through the display 140, and request user input through the input device 150, by way of an interactive, menu-driven, visual display-based user interface, or graphical user interface (GUI). Alternatively, the communication may be text based only, or a combination of text and graphics. The user interface may be executed, for example, on a personal computer (PC) with a mouse and keyboard, with which the user may interactively input information using direct manipulation of the GUI. Direct manipulation may include the use of a pointing device, such as a mouse or a stylus, to select from a variety of selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of a mouse or buttons or keys, including for example, a trackball, a scroll wheel, a touch screen or a voice-activated system.

The different components of the user interface device 10, the computing module device 20, and the imaging device 25 can be linked together, to communicate with each other, by the communication bus 160. In various embodiments, any combination of the components can be connected to the communication bus 160, while other components may be separate from the user interface device 10 and the remote database device 20 and may communicate to the other components by way of the communication interface 130.

Some applications of the system and method for analyzing an image may not require that all of the elements of the system be separate pieces. For example, in some embodiments, combining the user interface device 10 and the computing module device 20 may be possible. Such an implementation may be usefully where internet connection is not readily available or portability is essential.

Figure 3:
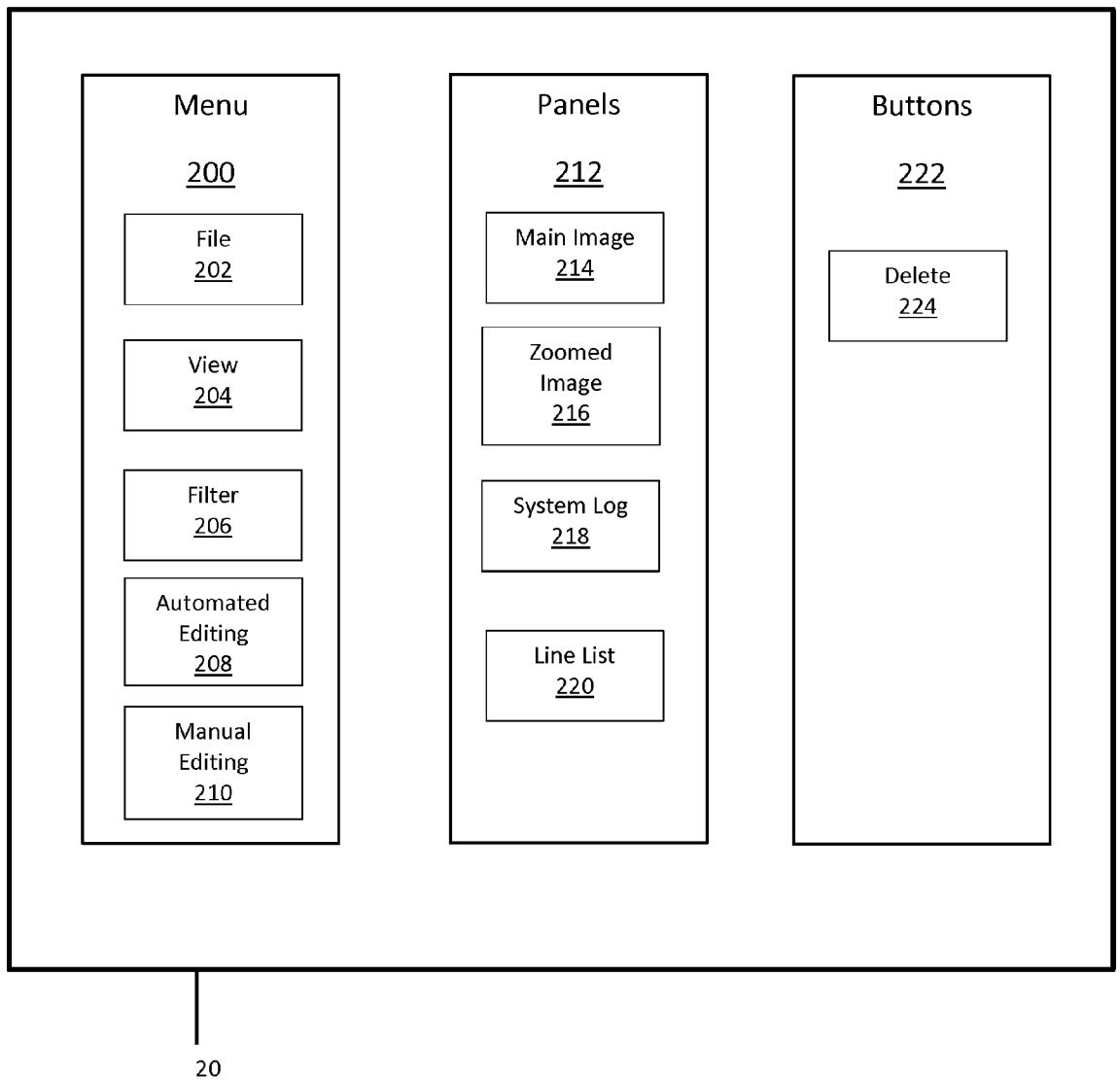
FIG. 3 illustrates a second schematic view of the computing device for image processing according to an embodiment of the present invention.

FIG. 3 illustrates a schematic diagram of a program disposed within computer module device 20 according to an embodiment of the present invention. The program can be disposed within the memory 110 or any other suitable location within computer module device 20. Menu Module 200 includes the menus for the program including the file menu 202, view menu 204, filter menu 206, automated editing menu 208, and manual editing menu 210. The file menu 202 includes various functions related to operation of the software. One function included within the file menu is the "open" function, which opens an ASCII encoded file containing the AFM data. The open function in some instances can require some preprocessing with Gwyddion. However, any other functionality known to one of skill in the art could also be used. The file menu also includes a feature referred to as "write lengths," which writes an ASCII encoded text file, of a user defined name, containing the length of each carbon nanotube identified by the program.

View menu 204, illustrated in FIG. 3, includes functionality to change the format of the image being viewed by the user on the display. The functions on the view menu can include, but are not limited to the following: Show Gray-scale Image, Show Filters, Show Line Ends, Show Drawn Lines, Show Erasures, Show Automatically Drawn Points, and Show Lines. These functions are given only as examples and any other image view functions known to one of skill in the art could also be used.

Filter menu 206, illustrated in FIG. 3, includes functions for filtering the image that is of interest to the user. The filter menu 206 can include a height filter which is a simple low-pass and high-pass filter, and a block cutter which removes areas of the image with too great a density of features. A non-line cutter can be included to do geometric filtering, such that a line has a height gradient vector which points in a direction perpendicular to the line itself. This function can also be handled by the small noise filter. The small noise filter removes small discontinuous features.

The automated editing menu 208 provides options for the user to select automatic editing functionality for editing of the image. For instance, the user can select identify lines, which is an implementation of a connected components labeling system. This function assigns each contiguous set of points that made it through the filters an ID number distinct from that of every other set of contiguous points. It should be noted that in this application two points are contiguous if and only if they have a separation under sqrt(8) pixels. For the rest of this section, the word line will refer to a set of contiguous points.

The automated editing menu 208 also includes an auto-connect function. Auto-connect is a statistical algorithm that attempts to make connections between the endpoints of nearby lines. It attempts to find the path of maximum deviation from the local background noise and then determines if said path deviates sufficiently to be considered a valid feature. The algorithm behind this menu option is referred to and described in more detail herein as the statistical connector. Another function on the automated editing menu 208 is the cross splitter. The cross splitter uses an end-finding algorithm to identify every point in a contiguous set of points. This maximizes the local distance from itself to every other point. It then assumes that carbon nanotubes are distinguishable from non-features by the fact that the ratio of the Cartesian distance between their endpoints to the distance along themselves is at a minimum for valid nanotubes. Using this data it separates out contiguous sets of points into different contiguous sets of points, each of which is internally assumed to be a valid carbon nanotube. The practical upshot of all of this is that when two nanotubes cross each other, this algorithm detects that and registers them as two different objects (rather than as one "line" object).

The automated editing menu 208 also includes a local saver function. Local saver is a statistical algorithm that attempts to fill in the gap between many small lines, in the event that a tube is split into several pieces by the height filter. This algorithm looks for points that deviate significantly from the local mean and which increase the magnitude of the local hough transform peak. The ant trace function is included in the automated editing menu 208, as well. Ant trace allows cellular automata to trace out contiguous and geometrically acceptable, i.e. not too strongly curved at any point, carbon nanotubes. This feature can also be deployed using a combination of the auto connect and cross splitter methods. The automated editing menu 208 includes a global hough transformation for debugging purposes.

Additionally, the automated editing menu 208 includes a gradient saver function to identify feature points based on the local derivative of the height data and how randomly, or non-randomly, the direction data is distributed. The local saver is effectively a local leveling algorithm. Local saver does not level the data, nor does it use division to produce relative data, which can produce poor results. Rather, it attempts to find points which are statistically significant deviations from the background, which come in groups, and which geometrically "fit" into a line object. The auto connector does better than the gradient saver because again it is able to look at how significant the deviations are, to adjust for noise, to take into account both the geometry and the height, and it is able to evaluate entire solution candidates. For instance, it produces possible solutions and then evaluates the whole, using a similar local statistical method, to figure out if it is significant enough to be a feature.

The automated editing menu 208 also includes a genetic function that allows the program to "breed a better answer." This feature initializes a population of randomly generated nanotube candidate objects and produce new generations by using combinations of individuals in the existing population, giving preference to the genes (descriptive data) of individuals in the population who met certain criteria the best (known as a fitness function). The auto-connect menu option can also be used to achieve the same results as the genetic function. An additional menu option dubbed "Do it All!" automatically performs the height filter, block cutter, local saver, auto-connector, identify lines, and cross-splitter algorithms. These functions are performed in that approximate order with certain "glue" algorithms holding them together due to the need of certain algorithms to have certain pieces of data, such as the line database, updated several times, leading to the identify lines algorithm actually being called many times during one execution of the overall algorithm. The net run-time for this algorithm, as measured on a 2.4 Ghz Core 2 Quad Q6600 (using only one core) was approximately 3.5 minutes.

The menu module 200 also includes a manual editing menu 210. Manual editing includes three sections that are not labeled within the program, but merely separated. The first section of the manual editing menu 210 includes a no-editing function. The manual editing menu 210 also includes an add lines feature. This is implemented by holding down the "Ctrl" button and clicking on several points, followed by a single click without the "Ctrl" button held down. This will draw a line connecting the clicked points in the order in which they were clicked. This feature can be implemented in any other way known to or conceivable by one of skill in the art. The first section of the manual editing menu also includes an eraser. The menu 210 will prompt the user for the size of the eraser in pixels. Following the prompt, it will then erase a square of that side length surrounding the clicked pixel. The menu 210 also includes a rectangle eraser that is implemented by clicking once in the upper-left hand corner of a rectangle and once in the lower-right hand corner will erase the entire rectangle. This is useful for removing large chunks of an image at once. The erasers can also be implemented in any other way known to or conceivable by one of skill in the art.

Section two of the manual editing menu 210 includes zooming, which will allow both zooming functionality and functionality to keep the window at the desired size. A zoomed Hough transform is also available to performs a local Hough transform on the region surrounding the current mouse location. Depending on internal switches within the program, zoom can be set to update in real time with mouse movement or to wait for a click before updating. A real-time zoom function is also available. This function updates the zoom window with an image of the area immediately surrounding the mouse in real time as the mouse moves. The image shows up 300% bigger than the original. Clicking once will freeze the image and clicking a second time will unfreeze it. This is so that the user can look at a feature while making use of another tool.

Section three of the manual editing menu includes several additional features including undo. The undo feature undoes the previous action in most cases, but is not supported in all cases. This feature has a queue that stores a theoretically unlimited but in practice several-thousand action long list of things that can be undone. The practical effect is that after a long time editing it enables everything to be undone. A redo feature redoes the previously undone action. All functions support this. Similar to the undo queue, there is a redo queue with nearly identical properties. A graph function graphs the current carbon nanotube length distribution as stored internally in the program in the zoom panel. No scale or numbers are given; this feature is just to give an idea of the shape of the distribution.

As illustrated in FIG. 3, the computing module 20 also includes a panels module 212. The panels module 212 is related to the display, as seen by the user. The panels module 212 includes the main image 214 that displays the current image being worked on, and the zoomed image 216, which is a multipurpose panel that primarily serves to display a zoomed version of the main image. A system log 218 is located just below the zoomed image panel, and displays the status of every function that has been run, including certain quantitative data such as where the automatic height threshold for the low-pass filter was set. A line list 220 is located on the far-right of the program. This panel displays each "line" (contiguous set of points) currently stored in the program. It shows the ID number of each line as well as its length (in pixels). This list 220 is sortable by either ID number or by length. Clicking on an entry in this list 220 will highlight it in the Main Image. Similarly clicking on a line in the main image 214, after lines have been identified, will give the ID number of the line in the system log. This description of the display and panels module 212 is exemplary and any means of organization for the display, known to or conceivable by one of skill in the art, can be used.

The computing module 20 also includes a buttons module 222. The buttons module 222 can include a number of buttons for operation of various aspects of the program. For instance the buttons module can include a delete button 224 located below the line list 220, in the display as seen by the user, this button will remove the selected line from the program's memory and will erase it from the image. Any other buttons known to or conceivable by one of skill in the art could also be used.

Figure 4:
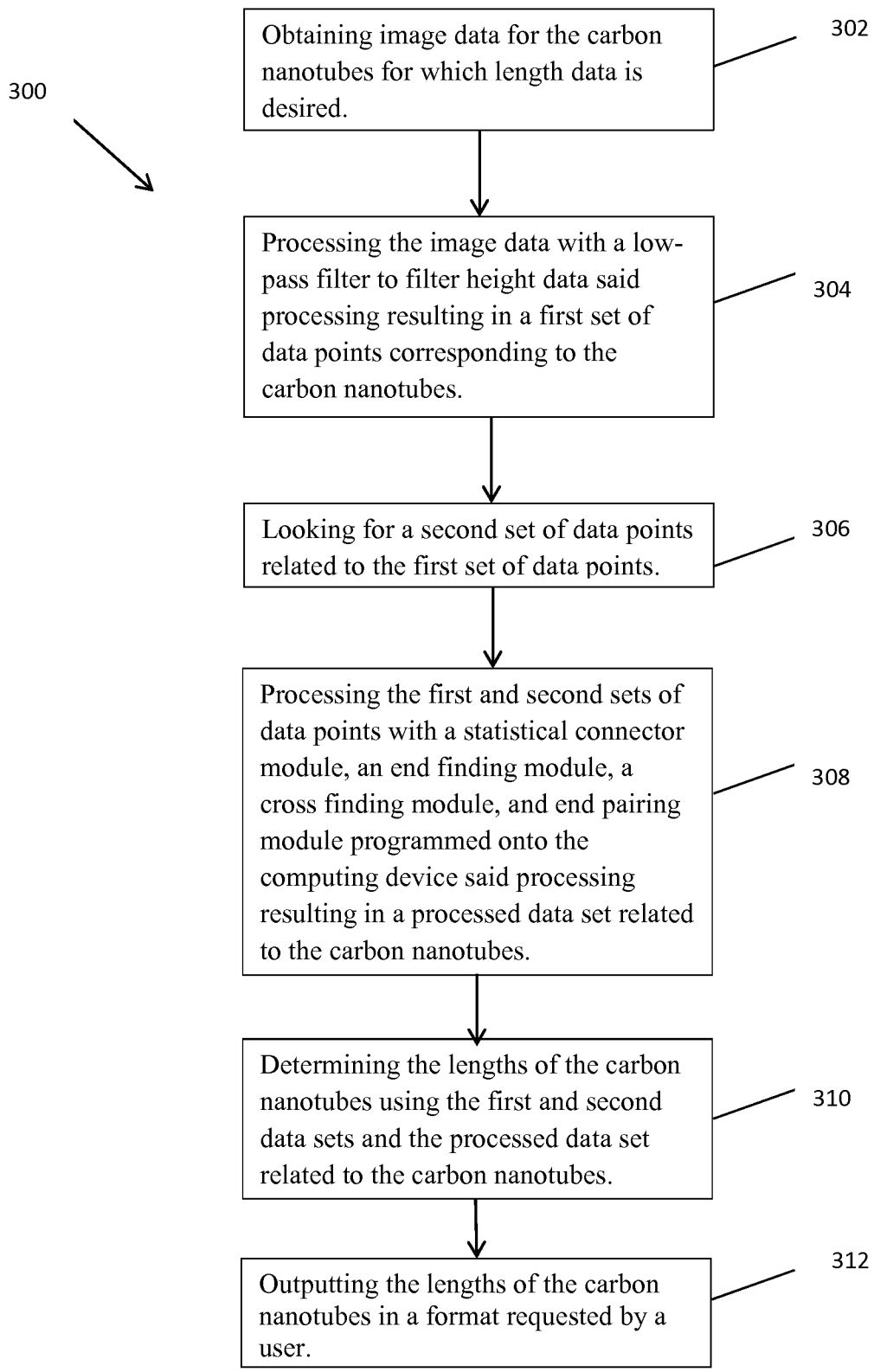
FIG. 4 illustrates a flow diagram of a method for processing an image to obtain data related to carbon nanotubes, according to an embodiment of the present invention.

FIG. 4 illustrates a flow diagram of a method for processing an image to obtain data related to carbon nanotubes, according to an embodiment of the present invention. The method 300 for determining lengths of carbon nanotubes, to be executed on a computing device, includes a step 302 of obtaining image data for the carbon nanotubes for which length data is desired. The method also include a step 304 of processing the image data with a low-pass filter to filter height data said processing resulting in a first set of data points corresponding to the carbon nanotubes. Another step 306 includes looking for a second set of data points related to the first set of data points, and yet another step 308 includes processing the first and second sets of data points with a statistical connector module, an end finding module, a cross finding module, and end pairing module programmed onto the computing device said processing resulting in a processed data set related to the carbon nanotubes. A step 310 includes determining the lengths of the carbon nanotubes using the first and second data sets and the processed data set related to the carbon nanotubes. The method also include a step 312 of outputting the lengths of the carbon nanotubes in a format requested by a user.

Figure 5:
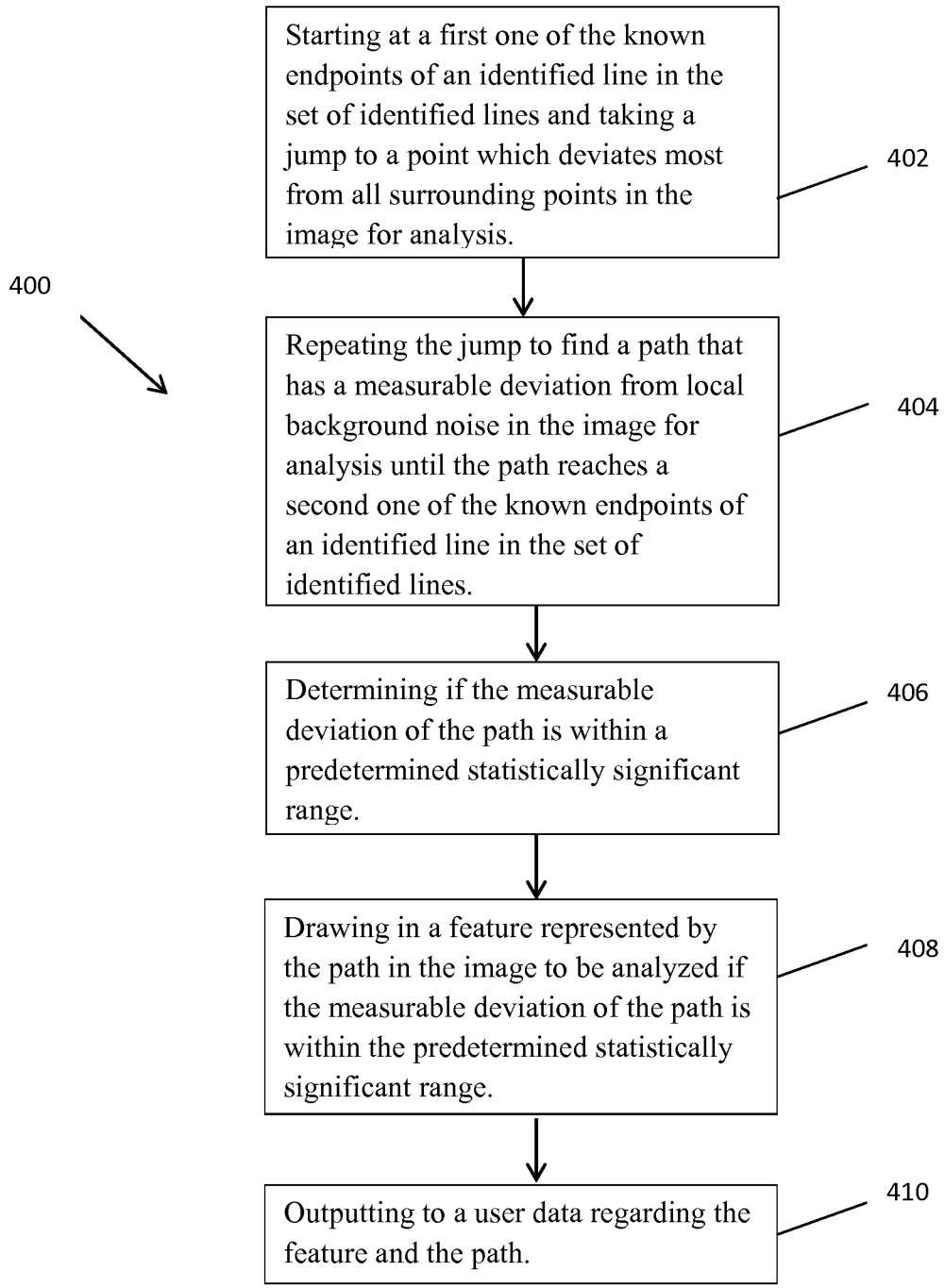
FIG. 5 illustrates a flow diagram of a method for determining connected endpoints in an image according to an embodiment of the present invention.

FIG. 5 illustrates a flow diagram of a method for determining connected endpoints in an image according to an embodiment of the present invention. The method 400 for determining, amongst a set of identified lines with known endpoints, which endpoints are connected in an image for analysis programmed onto a computing device, includes a step 402 of starting at a first one of the known endpoints of an identified line in the set of identified lines and taking a jump to a point which deviates most from all surrounding points in the image for analysis. The method includes another step 404 of repeating the jump to find a path that has a measurable deviation from local background noise in the image for analysis until the path reaches a second one of the known endpoints of an identified line in the set of identified lines. A step 406 includes determining if the measurable deviation of the path is within a predetermined statistically significant range. The method also includes a step 408 of drawing in a feature represented by the path in the image to be analyzed if the measurable deviation of the path is within the predetermined statistically significant range. Additionally, the method includes step 410 of outputting to a user data regarding the feature and the path.

Figure 6:
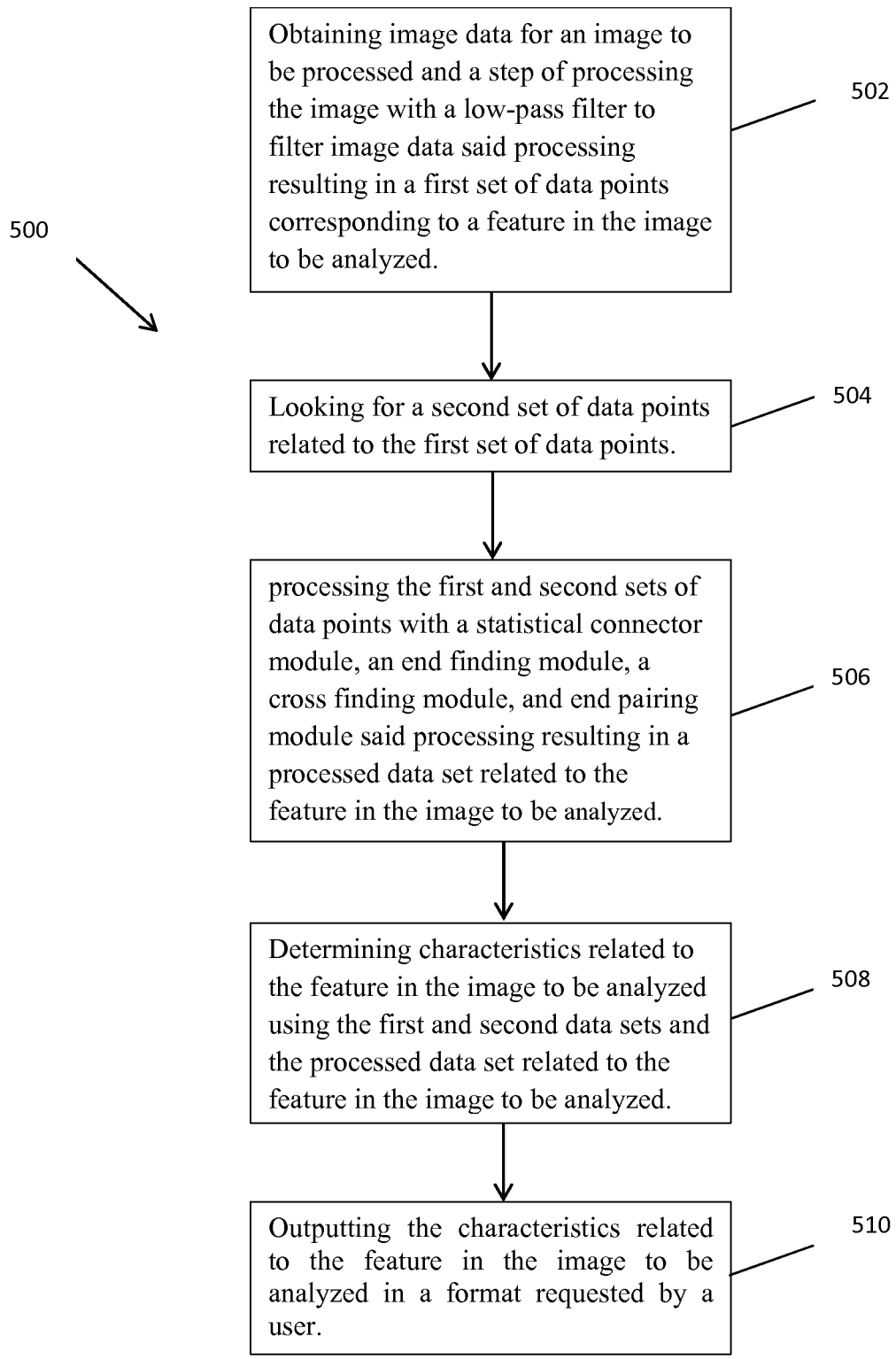
FIG. 6 illustrates a flow diagram of a method for processing an image to obtain data related to a subject of the image, according to an embodiment of the present invention.

FIG. 6 illustrates a flow diagram of a method for processing an image to obtain data related to a subject of the image, according to an embodiment of the present invention. The method 500 for lightweight image processing, programmed on a computing device, includes a step 502 of obtaining image data for an image to be processed and a step of processing the image with a low-pass filter to filter image data said processing resulting in a first set of data points corresponding to a feature in the image to be analyzed. The method includes a step 504 of looking for a second set of data points related to the first set of data points and a step 506 of processing the first and second sets of data points with a statistical connector module, an end finding module, a cross finding module, and end pairing module said processing resulting in a processed data set related to the feature in the image to be analyzed. Another step 508 includes determining characteristics related to the feature in the image to be analyzed using the first and second data sets and the processed data set related to the feature in the image to be analyzed. The method also includes a step 510 of outputting the characteristics related to the feature in the image to be analyzed in a format requested by a user.

The program includes several algorithms, described briefly above with respect to the steps of the method, which will now be described in further detail. Exemplary code is included at the end of the detailed description, in order to further illustrate these algorithms. The statistical connector algorithm is described in more detail, below. Given a set of identified lines, along with the known endpoints of these lines, the statistical connector determines which pairs of ends ought to be connected. In the pseudo-code that follows, lines is a list of all line objects identified and each line object has an array ends[ ], which lists the endpoints of that line. Additionally, in all following pseudocode, the exact implementation of the algorithms (from a data structures point of view) may not be as it is in the program. That is, to simplify the pseudo-code, an Array-List or variant on a list object may be used in place of a simple Array (usually arrays were used internally to speed up the program, though at the cost of making the code slightly less readable). Additionally, to save space, certain pieces of the algorithm have been omitted where not essential to understanding how it works.

In conceptual terms, the statistical connector works by starting at one end and taking a jump to the point that deviates the most from all surrounding points. It then continues these jumps, always making sure that it is jumping somewhat towards the goal. More specifically, it may take any step which does not increase the distance to the destination. Once it reaches the destination it looks back on the entire path, including the in-between points, and checks to see the extent to which they deviate from the surrounding points. If it deviates by at least two standard deviations (arbitrarily chosen parameter) then it is determined to be a valid feature and is drawn in.

The end finding algorithm works by first picking a random point on the line. It then finds the farthest point on the line from that point and makes that the new starting point. It then finds the farthest point from that new starting point and continues in this manner until the new points it finds are the same as the last ones it used.

The cross-finding algorithm is conceptually simpler than the other algorithms, thus no pseudocode has been included. It looks at every point on the line and only points on the line; it does not look at points which have been identified as being on other lines and checks every point within a ring of inner radius r1 and outer radius r2, generally about 6 and 8 pixels respectively, centered at the point it is currently considering. Any points which lie within the ring form a new grid, essentially a new, smaller than 512×512, grid is formed which contains only the points on the ring. The line identifying algorithm, which is a specialized variant on a two-pass connected component labeling algorithm is then used to look for contiguous shapes. Each contiguous shape is essentially a cut up piece of a line heading either towards or away from the point in question. If there are at least four shapes found, there are at least two lines found and the point is labeled a crossing point. In general several nearby points will be labeled crossing points.

Finally, the end-pairing algorithm is in many ways similar to both the statistical connector and the end finder. It starts by identifying all end candidates. These are points which locally are as far away from the already identified endpoints as possible. That is, within the group of surrounding points they are local maxima in terms of distance from the endpoints. Then it considers the paths between all pairs of end candidates. The first path to be chosen and used is the path which maximizes the ratio between the geometric length "as the crow flies" and the length along the line. A perfectly straight line would have a ratio of 1, whereas more crooked lines have ratios approaching 0. It then eliminates the points used in the first path from consideration, except if they are around a cross point. It continues this process, iterating through all possible end candidate pairs until the entire line object has been separated out into different lines. In this way, the algorithm separates out crossed lines.

While the present invention has been designed with analysis of CNTs in mind, it should be noted that no algorithm used/developed has been specific to CNTs alone. All algorithms implemented are specific to linear objects. Any conglomerate of linear objects on a flat background may be analyzed with the present invention as long as certain factors such as the density of the objects in the field of view and the contrast between the objects and the background are within given limits, etc. Furthermore, with only a slight modification to the present invention (opening up some of the preset options to the end user) the end user would be able to modify these limits for their specific application. Thus, in its current form, the present invention is a very general method of analyzing linear objects on a constant background.

For instance, other applications of the present invention, beyond CNTs, include, analysis of microfilament structure (especially actin networks) within biological tissue. Given an AFM image of an actin network, the present invention could be used to extract the average pore size by first finding the total length of actin in view, then (knowing nearly constant width of actin filaments), the total area of the image covered by actin could be found and subtract this from the total area of the image, giving an average pore size. Another possible way of dealing with this would be to consider the Actin to be "noise" in the image because it is generally fairly easy to identify highly connected pieces of an image and determine their size. An Actin pore size calculator could then be implemented with minimal effort.

Taking the workable extent of the present invention one step further, it should be noted that many of the image analysis algorithms allow for curved objects as well as linear objects. Algorithms such as "Ant Trace" allow the user trace objects as they curve. With this in mind, it may be better to state that the software is capable of analyzing finite objects of high aspect ratio on a flat substrate. Now, by allowing for curved structures, long curved molecules such as DNA and RNA may be quantified and analyzed by the software. While full chromosomal DNA may violate the idea of being a "finite" structure, shorter structures such as DNA or RNA fragments might be better subjects for analysis.

The proposed invention is also is set to not retrace its steps around a closed loop. Therefore, the current algorithms for analyzing length could be reimplemented alongside the length analysis to give a quantification of objects' width and length. Alternatively, the known length (calculated by any of a number of ant traces) can be used to determine the ratio of area to length to give approximate width.

Note that the requirement of a flat substrate is not particularly constricting as the vast majority of microscopy requires a flat substrate anyways. Currently, in order to analyze the raw output of most AFM images the user must either use the export settings included in the AFM control software (often hard to manipulate and control) or pass the raw output through Gwyddion which is used simply to convert the raw image to a text file.

The algorithms that are behind the proposed invention are very general. There is no reason they must be restricted to analysis of nano- and micro-scale objects. Aerial images of canyons and river systems would, from an algorithmic standpoint, have few differences from the CNTs. In fact it is conceivable that the algorithms behind the present invention could be applied to analysis of nearly any semi-linear set of objects in an image with a relatively flat background.

The proposed invention can be applied to the large scale production of fixed length carbon nanotubes or other finite semi-linear (slightly curved) structures. This may be used as a quality check as well as a method for fine tuning the production parameters. With enough computer power, this invention could be used for tracking the motion of any semi linear structures—it would similarly be fairly easy to get quantitative dynamical information about these structures' interactions. Such as the aggregation of chain polymers, etc. The invention could also be applied to tracking geographic features in satellite data requires analyzing features which generally either resemble filaments or which resemble "blobs" bounded by filaments. In either case, the present invention could track changes in these features from day to day. The statistical connector algorithm can be used to search large location correlated databases for unusual and non-random features. That is, given some sort of connection between all data points (for data with three or more dimensions), this algorithm could be used to identify highly non-random features that correlate proximity in the first two (or possibly even in one) dimensions to value in the third. Telescope images of nebula often contain filaments of gas moving from one area to another, surrounded by diffuse gas, dense gas, and the occasional star. The present invention contains algorithms capable of differentiating these filaments from the rest of the system, and could be easily adapted to identify the other features commonly found in such images. Solar flares can be identified as filaments surrounding the sun. With a thresholding mechanism to block out the sun in solar imagery, these filaments could be automatically identified by the present invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

The statistical connector algorithm is as follows:

```
1    for each (line a in lines )
2        for each (line b in lines) // In the
             actual implementation this skips
             over all lines [[that]]
             the outer loop has looked at.
3        if (distance (a.ends [0] , b.ends [0] )<dmax)
4            stat_connector (a.ends[0] , b.ends [0])
5        if (distance (a.ends [0] , b.ends [0] )<dmax)
6            stat_connector (a.ends [0] , b.ends [0])
7        if (distance (a.ends [0] , b.ends [0] )<dmax)
8            stat_connector ( a.ends [0] , b.ends [0])
9        if (distance (a.ends [0] , b.ends [0] )<dmax)
10           stat_connector (a.ends [0] , b.ends [0])
```

The stat_connector function is defined as follows:

```
1    //The first five variables are already declared by the parameters of the
     function and the global variables it can access.
2    int x1 // x coordinate of first endpoint
3    int y1 //y coordinate of first endpoint
4    int x2 //x coordinate of second endpoint
5    int y2 //y coordinate of second endpoint
6    double [ ] [ ] height s // array of height data representing
         the edited AFM output
7    int x=x1 // temporary x coordinate
8    int y=y1 // temporary y coordinate
9    PathList path=new path
10   path.add (x , y);
11   while ( x!=x2 | | y!=y2 )
12   double dist=distance (x , y , x2 , y2)
13   double [ ] max=new double [3]
14   for (int i=x-2; i<x+3; i++)
15     for ( int j=y-2; j<y+3; j++)
16       PathList temp=new path
17       for (int k =i-2 ; k < i + 3 ; k++)
18         for ( int l = j-2 ; l < j+ 3 ; l++)
19           temp.add (k , l )
20       double sample_mean=heights [ i ] [ j ]
21       double [ ] value s=new double [temp.length];
22       for (i nt k=0;k<count e r ; k++)
23         values [k]=he ights [temp [k].x] [temp[k].y]
```

-continued

```
24    double variance=util.variance (values); // Calculates the root-mean-square
          of the values list
25    double mean=0;
26    for (int q=0;q<temp.length ; q++)
27        mean+=values [q]
28    mean/=temp.length
29    double p=util.normcdf (mean , variance , sample_mean )
30    if (p>max [0])
31        max[0]=p
32        max[1]=i
33        max[2]=j
34    if (i==x2 && j==y2)
35        max[0]=100
36        max[1]=i
37        max[2]=j
38  x=max [1]
39  y=max [2]
40  path.add (x , y) ;
41  PathList temp2=new path
42  for (int i =0; i<templength ; i++)
43      PathList temp3=util.points_between ( path [ i ] , path [ i +1]) //
          returns the list of
          point s in the antialiased line between the two input point s
44      for (int j =0; j<temp.length ; j++)
45          temp2.add (temp3 [j])
46  double sample_mean=0
47  int counter=0
48  for (int i =0; i<temp2 . length ; i++)
49      if (temp2 [i] has not been manually erased) //There's a function
          for checking this
50          sample_mean+=heights [temp2 [i].x] [temp2 [i].y]
51          counter++
52  sample_mean/=counter
53  double [ ] values=new double [counter]
54  for (int i =0; i<counter ; i++)
55      values [i]=temp [i]
56  double variance=util.variance (values)
57  double mean=0
58  for (int i =0; i<counter ; i++)
59      mean+=values [i]
60  mean/=counter
61  if ((sample_mean-mean)/Math . sqrt (variance)>2) //2 standard deviations
62      graphics.drawlines (path) //draws the connection
63  return 1
```

The pseudo-code for the end finding algorithm works as follows:

```
1   boolean [ ] [ ] points // Initialized with false if the point is off the line,
        true if it is on the line
2   double [ ] [ ] dist //Not yet initialized
3   Stack oldx=new Stack ( )
4   Stack oldy=new Stack ( )
5   int newx=x //x and y are randomly chosen points on the line
6   int newy=y
7   double max=0
8   double oldmax=0
9   double maxdelta=1
10  while (maxdelta>0)
11      oldx . push (newx )
12      oldy . push (newy )
13      find_dists (newx , newy ) //A function which populates the dist grid with the
          distances from the point (newx , newy ) to each point in the grid . A point right next to
          (newx , newy ) will have a value of 1 ( or sqrt (2) depending on if it is a corner). Further
          out point s have greater values. This function works on an exhaustive search.
14      for each (point in grid)
15          if (dist (point)>max && points (point)==true)
16              newx=point.x
17              newy=point.y
18              max=dist (point)
19          maxdelta=max-oldmax
20          oldmax=max
21  double [ ] [ ] ends=new double [3] [2]
22  ends [1] [0]=newx
23  ends [1] [1]=newy
24  int x1=newx
```

```
25    int y1=newy
26    while (x1==newx && y1==newy && oldx . empty ( )==false)
27        x1=oldx . pop ( )
28        y1=oldy . pop ( )
29    ends [0] [0]= x1
30    ends [0] [1]= y1
31    ends [2] [0]=max
32    return ends
```

What is claimed is:

1. A method for determining lengths of carbon nanotubes, to be executed on a computing device, comprising:

obtaining image data for the carbon nanotubes for which length data is desired;

processing the image data with a low-pass filter to filter height data said processing resulting in a first set of data points corresponding to the carbon nanotubes;

looking for a second set of data points related to the first set of data points;

processing the first and second sets of data points with a statistical connector module, an end finding module, a cross finding module, and end pairing module programmed onto the computing device said processing resulting in a processed data set related to the carbon nanotubes;

determining the lengths of the carbon nanotubes using the first and second data sets and the processed data set related to the carbon nanotubes;

outputting the lengths of the carbon nanotubes in a format requested by a user; and wherein said statistical connector module executes a method for determining, amongst a set of identified lines with known endpoints, which endpoints are connected in an image for analysis by:

starting at a first one of the known endpoints of an identified line in the set of identified lines and taking a jump to a point which deviates most from all surrounding points in the image for analysis;

repeating the jump to another point which deviates most from all of the surrounding points to find a path that has a measurable deviation from local background noise in the image for analysis until the path reaches a second one of the known endpoints of an identified line in the set of identified lines;

determining if the measurable deviation of the path is within a predetermined statistically significant range;

drawing in a feature represented by the path in the image to be analyzed if the measurable deviation of the path is within the predetermined statistically significant range; and outputting to a user data regarding the feature and the path.

2. The method of claim 1, further comprising the predetermined statistically significant range comprising two standard deviations.

3. The method of claim 1, further comprising the end finding module executing a method comprising:

picking a first random point on a line within the first and second sets of datapoints;

finding a second random point that is farthest from the first random point;

making the second random point a first starting point;

finding a third random point that is farthest from the second random point and labeling the third random point as the second starting point; and continuing until a last point is the same as the previous point used.

4. The method of claim 1, further comprising the cross-finding module executing a method comprising:

looking at a first point of every point on a line formed by the points in the first and second datasets;

checking the first point within a ring having an inner radius r1 and an outer radius r2, wherein r1<r2, and wherein the ring is centered at the first point;

forming a grid from all of the points that lie within the ring;

looking for a contiguous shape within the grid; and labeling the first point as a cross point if at least two contiguous shapes are found.

5. The method of claim 1, further comprising the end finding module executing a method comprising:

identifying all end point candidates within the first and second datasets;

considering paths between all end point candidates; and choosing one of the paths that maximizes the ratio between a direct length and a length along the path.

6. The method of claim 1 wherein the output comprises a list of a length for each carbon nanotube in the image.

7. The method of claim 1 further comprising a user manually intervening in the method to assist in the process of determining a length for each carbon nanotube in the image.

8. A method for lightweight image processing, programmed on a computing device, comprising:

obtaining image data for an image to be processed;

processing the image with a low-pass filter to filter image data said processing resulting in a first set of data points corresponding to a feature in the image to be analyzed;

looking for a second set of data points related to the first set of data points;

processing the first and second sets of data points with a statistical connector module, an end finding module, a cross finding module, and end pairing module said processing resulting in a processed data set related to the feature in the image to be analyzed;

determining characteristics related to the feature in the image to be analyzed using the first and second data sets and the processed data set related to the feature in the image to be analyzed;

outputting the characteristics related to the feature in the image to be analyzed in a format requested by a user wherein the cross-finding module executes a method of looking at a first point of every point on a line formed by the points in the first and second datasets;

checking the first point within a ring having an inner radius r1 and an outer radius r2, wherein r1<r2, and wherein the ring is centered at the first point;

forming a grid from all of the points that lie within the ring;

looking for a contiguous shape within the grid; and labeling the first point as a cross point if at least two contiguous shapes are found.

9. The method of claim 8 wherein the feature in the image to be analyzed is a carbon nanotube.

10. The method of claim 9 wherein the output comprises a list of a length for each carbon nanotube in the image.

11. The method of claim 8 further comprising said statistical connector module executing a method for determining, amongst a set of identified lines with known endpoints, which endpoints are connected in an image for analysis, comprising:
- starting at a first one of the known endpoints of an identified line in the set of identified lines and taking a jump to a point which deviates most from all surrounding points in the image for analysis;
- repeating the jump to find a path that has a measurable deviation from local background noise in the image for analysis until the path reaches a second one of the known endpoints of an identified line in the set of identified lines;
- determining if the measurable deviation of the path is within a predetermined statistically significant range;
- drawing in a feature represented by the path in the image to be analyzed if the measurable deviation of the path is within the predetermined statistically significant range; and
- outputting to a user data regarding the feature and the path.

12. The method of claim 11, further comprising the predetermined statistically significant range comprising approximately two standard deviations.

13. The method of claim 8, further comprising the end finding module executing a method comprising:
- picking a first random point on a line within the first and second sets of datapoints;
- finding a second random point that is farthest from the first random point;
- making the second random point a first starting point;
- finding a third random point that is farthest from the second random point and labeling the third random point as the second starting point; and
- continuing until a last point is the same as the previous point used.

14. The method of claim 8, further comprising the end finding module executing a method comprising:
- identifying all end point candidates within the first and second datasets;
- considering paths between all end point candidates; and
- choosing one of the paths that maximizes the ratio between a direct length and a length along the path.

* * * * *